United States Patent
Lo

(10) Patent No.: US 7,570,657 B1
(45) Date of Patent: *Aug. 4, 2009

(54) AUTONEGOTIATION BETWEEN 1000BASE-X AND 1000BASE-T

(75) Inventor: William Lo, Cupertino, CA (US)

(73) Assignee: Marvell International Ltd., Hamilton (BM)

(*) Notice: Subject to any disclaimer, the term of this patent is extended or adjusted under 35 U.S.C. 154(b) by 1553 days.

This patent is subject to a terminal disclaimer.

(21) Appl. No.: 09/991,284

(22) Filed: Nov. 21, 2001

Related U.S. Application Data

(60) Provisional application No. 60/256,116, filed on Dec. 15, 2000.

(51) Int. Cl.
*H04J 3/22* (2006.01)
(52) U.S. Cl. ........................... 370/465; 370/466
(58) Field of Classification Search ............... None
See application file for complete search history.

(56) References Cited

U.S. PATENT DOCUMENTS

| 5,410,535 A | | 4/1995 | Yang et al. |
| 5,414,708 A | | 5/1995 | Webber et al. |
| 5,577,023 A | | 11/1996 | Marum et al. |
| 5,586,117 A | * | 12/1996 | Edem et al. ............ 370/466 |
| 5,737,108 A | | 4/1998 | Bunch et al. |
| 5,784,375 A | * | 7/1998 | Kalkunte et al. ......... 370/448 |
| 5,809,026 A | | 9/1998 | Wong et al. |
| 5,889,766 A | | 3/1999 | Ohnishi et al. |
| 5,889,776 A | | 3/1999 | Liang |
| 5,892,926 A | | 4/1999 | Witkowski et al. |
| 5,922,052 A | * | 7/1999 | Heaton .................. 709/223 |
| 5,923,663 A | | 7/1999 | Bontemps et al. |
| 5,933,427 A | | 8/1999 | Liang |
| 5,991,303 A | | 11/1999 | Mills |
| 6,002,279 A | | 12/1999 | Evans et al. |
| 6,081,523 A | | 6/2000 | Merchant et al. |

(Continued)

FOREIGN PATENT DOCUMENTS

EP  00273080 A1  7/1988

(Continued)

OTHER PUBLICATIONS

U.S. Appl. No. 09/501,556, filed Feb. 9, 2000, Sutardja et al.

(Continued)

*Primary Examiner*—William Trost
*Assistant Examiner*—Toan D Nguyen

(57) ABSTRACT

An autonegotiation circuit for gigabit per second Ethernet networks includes a switch with 1000BASE-X media. A gigabit interface connector (GBIC) module connects the switch to the device and allows autonegotiation. The switch includes a first GBIC interface with a transmitter and a receiver. The GBIC module includes a second GBIC interface with a transmitter and a receiver and a first copper interface with a transmitter and a receiver. The device includes a second copper interface with a transmitter and a receiver. The GBIC module waits for non-zero configuration ordered sets from the switch. The GBIC module stores configuration information from the switch and then sends FLP bursts to the device. 1000BASE-T autonegotiation is completed and a link is established between the GBIC module and the device. The GBIC module stores second configuration information from the device. Then, the GBIC module completes 1000BASE-X autonegotiation and establishes a link.

78 Claims, 7 Drawing Sheets

U.S. PATENT DOCUMENTS

| | | | |
|---|---|---|---|
| 6,108,726 A | 8/2000 | Runaldue et al. | |
| 6,115,389 A | 9/2000 | Mahale et al. | |
| 6,141,352 A | 10/2000 | Gandy | |
| 6,148,002 A | 11/2000 | Patel et al. | |
| 6,169,746 B1 | 1/2001 | Ueda et al. | |
| 6,175,865 B1 | 1/2001 | Dove et al. | |
| 6,201,796 B1 | 3/2001 | Agazzi et al. | |
| 6,243,756 B1 | 6/2001 | Whitmire et al. | |
| 6,272,552 B1 | 8/2001 | Melvin et al. | |
| 6,295,281 B1 | 9/2001 | Itkowsky et al. | |
| 6,359,893 B1 | 3/2002 | Mills | |
| 6,385,208 B1 | 5/2002 | Findlater et al. | |
| 6,434,716 B1* | 8/2002 | Johnson et al. | 714/712 |
| 6,504,851 B1* | 1/2003 | Abler et al. | 370/466 |
| 6,516,352 B1* | 2/2003 | Booth et al. | 709/250 |
| 6,529,957 B1* | 3/2003 | Joergensen | 709/233 |
| 6,600,755 B1* | 7/2003 | Overs et al. | 370/465 |
| 6,717,941 B1* | 4/2004 | Dwork | 370/381 |
| 6,965,610 B2* | 11/2005 | Creigh | 370/465 |
| 7,068,609 B2* | 6/2006 | Huff | 370/252 |
| 2002/0126684 A1 | 9/2002 | Findlater et al. | |

FOREIGN PATENT DOCUMENTS

| | | | |
|---|---|---|---|
| EP | 00577435 | A1 | 7/1993 |
| EP | 00596523 | A2 | 5/1994 |
| EP | 00596523 | A3 | 1/1996 |
| EP | 00577435 | B1 | 2/1999 |
| WO | WO 09413072 | A1 | 6/1994 |
| WO | WO 09619877 | A1 | 6/1996 |
| WO | WO 9946867 | | 9/1999 |
| WO | WO 0027079 | | 5/2000 |
| WO | WO 0028663 | | 5/2000 |
| WO | WO 0028668 | | 5/2000 |
| WO | WO 0028691 | | 5/2000 |
| WO | WO 0028712 | | 5/2000 |
| WO | WO 0035094 | | 6/2000 |
| WO | WO 00054419 | A1 | 9/2000 |

OTHER PUBLICATIONS

RMII Consortium, RMII Specification, AMD Inc., Broadcom Corp., National Semiconductor Corp., and Texas Instruments Inc., 1997, pp. 1-14 and Rev. A.

IEEE Standard 802.3 1988 Edition 22.1 and 35.1.

IEEE Std 802.3, 1998 Edition, Part 3: Carrier Sense Multiple Access With Collision Detection (CSMA/CD) Access Method and Physical Layer Specifications, New York, NY, pp. 1-1222.

IEEE Standards (IEEE Std. 802.3-2002), "Part 3: Carrier sense multiple access with collision detection (CSMA/CD) access method and physical layer specifications, pp. 1-581".

* cited by examiner

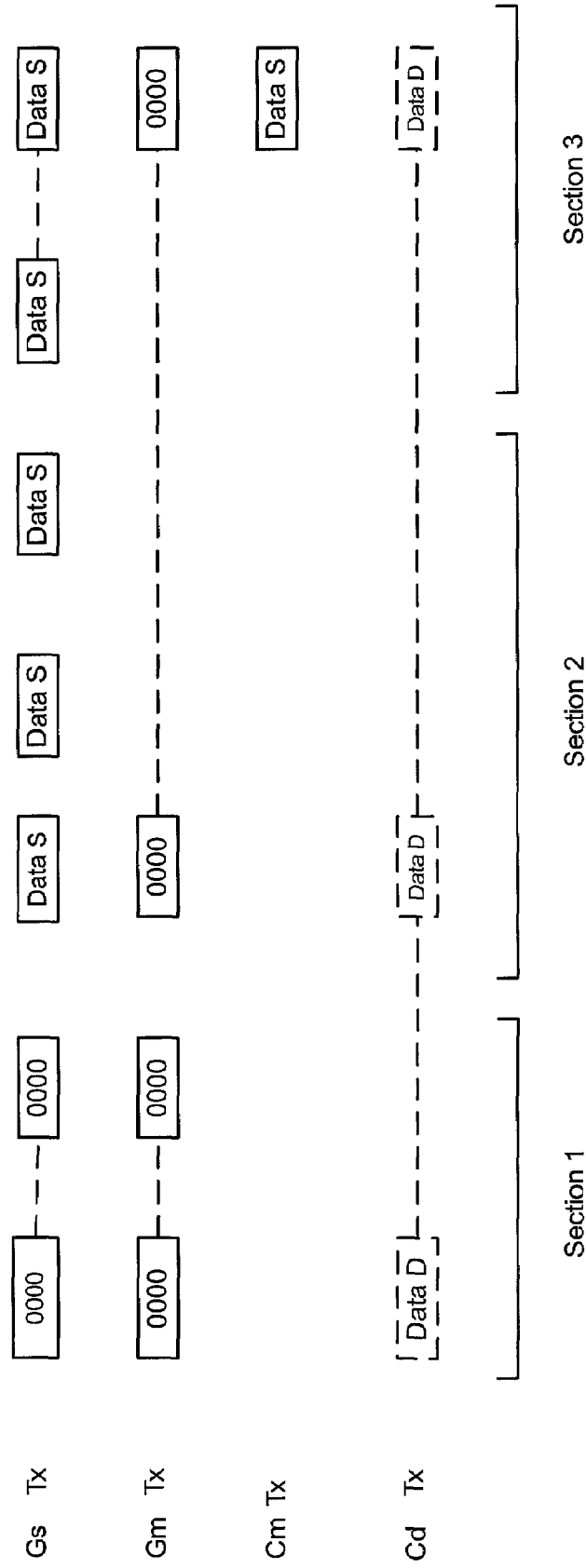

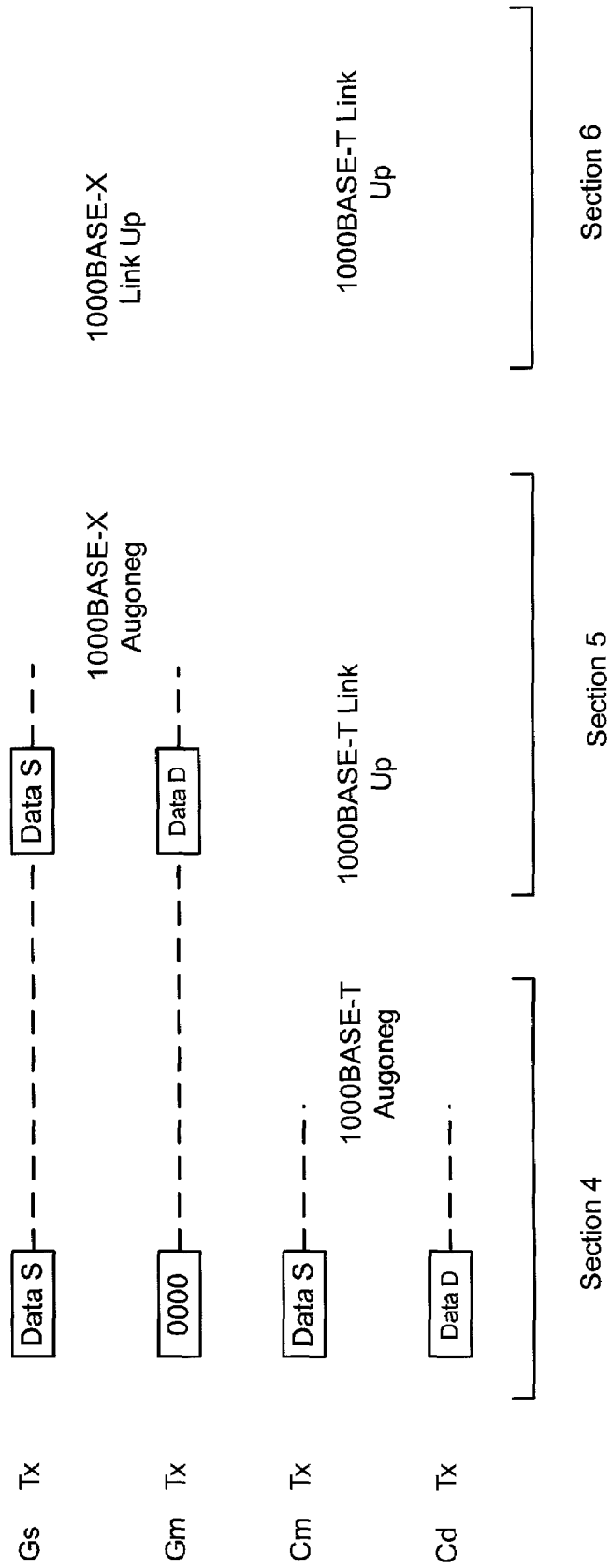

AUTONEGOTIATION BETWEEN 1000BASE-X AND 1000BASE-T

CROSS-REFERENCE TO RELATED APPLICATIONS

This application claims the benefit of U.S. Provisional Application No. 60/256,116, filed Dec. 15, 2000, which is hereby incorporated by reference.

FIELD OF THE INVENTION

The present invention relates to networks, and more particularly to autonegotiation circuits within the physical layer of devices that are connected by an Ethernet network.

BACKGROUND OF THE INVENTION

Ethernet is a shared local area (LAN) networking technology that was developed in the early 1970s. The basic design includes a shared transmission medium such as coaxial cable and optical fiber. Since the communication medium is shared, nodes listen to make sure that the cable is not in use before transmitting data. Ethernet also defines protocols to handle collisions that occur when two nodes transmit data simultaneously.

Ethernet switches are Layer 2 devices that provide a switching matrix or fabric that can temporarily connect a port to any other port. For example, a computer A is connected to port A of a switch. A computer D is connected to port D of the switch. The switch connects the ports A and D and provides a contentionless, full-bandwidth link to the computers A and D. Since the computers A and D are the only devices that are connected to the link, they are the only devices that compete for the link. The switch forwards frames or packets from one port to another—unlike a hub that forwards frames or packets to all other ports. This reduces traffic and increases security. A group of computers or nodes may also share a single port of the switch. Multilayer switches combine routing functions with switching. Other switches provide half and full duplex modes. The full duplex mode allows systems to establish connections and to send and receive data across a separate twisted pair or other media.

Gigabit Ethernet networks provide transmission speeds of 1000 Mb/s and include modes such as 1000Base-X and 1000Base-T. 1000Base-X modes include 1000Base-LX (IEEE 802.3z) and 1000Base SX (IEEE 802.3z). 1000Base-LX implements long-wavelength (1310 nm) laser transmissions with links up to 550 meters over multimode fiber optic cable and 3000 meters over single mode fiber optic cable. 1000Base SX implements short-wavelength (850 nm) laser transmissions over multimode fiber optic cable. 1000Base-T provides transmissions over four pairs of category 5 cable with a maximum distance of 100 meters per station to a switch or 205 meters end to end.

Referring now to FIG. 1, a flexible Ethernet switch 10 allows selection of the type of physical media that is used. The switch 10 includes a plurality of ports 12-1, 12-2, . . . , and 12-n. Some of the ports such as ports 12-1, 12-2, 12-3, and 12-4 are fixed media ports. Other ports such as ports 12-5 and 12-6 are configurable media ports. Gigabit interface connector (GBIC) modules 16-1 and 16-2 are connected to one of the configurable ports 12-5 and/or 12-6. Since both sides (20-1 and 22-1 and 20-2 and 22-2) of the GBIC modules 16-1 and 16-2 are 1000BASE-X, autonegotiation information can be passed freely to physical layers 24-1 and 24-2 of devices 26-1 and 26-2 that are connected thereto, respectively.

Referring now to FIG. 2, for purposes of clarity reference numbers from FIG. 1 have been used in FIG. 2 to identify similar elements. A GBIC module 40 includes a physical layer with an integrated serializer/deserializer (SERDES). The GBIC module 40 connects 1000BASE-X media 20-1 and 20-2 from the switch 10 to 1000BASE-T media 42-1 and 42-2. The 1000Base-T media 42-1 and 42-2, in turn, is connected to physical layers 44-1 and 44-2 of devices 46-1 and 46-2, respectively. For example, see U.S. patent application Ser. No. 09/501,556, filed Feb. 9, 2000 and assigned to the assignee of the present invention, which is hereby incorporated by reference. Since there is no direct path between 1000BASE-X and 1000BASE-T networks for passing autonegotiation information, 1000BASE-X autonegotiation is disabled.

1000BASE-X autonegotiation information is exchanged by using special code groups that are not used during normal packet transmission. In 1000BASE-X autonegotiation, two devices (P and Q) communicate with each other over a link. The device Q is the link partner of the device P and the device P is the link partner of the device Q. 1000BASE-X autonegotiation uses the underlying media to pass 16 bits of autonegotiation information at a time. The 16 bits of autonegotiation information are embedded in configuration ordered sets that are not used during normal data transmission. Therefore, devices are able to distinguish whether the transmitted data is a normal packet or autonegotiation data.

When the device P transmits a first configuration ordered set with all 16 bits set equal to zeros, the link partner Q knows that the device P is restarting autonegotiation. The device P continues to transmit the first configuration ordered set with all zeros until it is ready to start autonegotiation. Once the device P is ready to start autonegotiation, it transmits a second configuration ordered set with 16 bits of autonegotiation data. At this point, the second configuration ordered set is not all zeros. The device P continues to transmit the second configuration ordered set until the link partner Q transmits a second configuration ordered set that is not all zeros. When both of the devices P and Q are transmitting the second configuration ordered sets, autonegotiation continues according to the IEEE protocol for exchanging data.

There are currently 6 bits of the second configuration ordered set that are defined for 1000BASE-X media. These bits indicate 1000BASE-X full duplex, 1000BASE-X half duplex, pause, asymmetric pause, remote fault 1 and remote fault 2. A device advertises these capabilities by either setting or clearing the defined bits. The device may advertise that it has the function only if it can actually perform that function. However, the functionally capable device may choose to not advertise the function.

SUMMARY OF THE INVENTION

An autonegotiation circuit for Ethernet networks according to the invention includes a first device that is connected to a first media. A second device is connected to a second media. A network interface connector (NIC) module is connected to the first device by the first media and to the second device by the second media. The NIC module provides autonegotiation between the first and second devices.

In other features of the invention, the first device includes a first NIC interface including a transmitter and a receiver. The NIC module includes a second NIC interface with a transmitter and a receiver and a first copper interface with a transmitter and a receiver. The second device includes a second copper interface with a transmitter and a receiver. The transmitter of the first NIC interface is connected to the receiver of the second NIC interface. The receiver of the first NIC interface is connected to the transmitter of the second NIC interface. The transmitter of the first copper interface is connected to the receiver of the second copper interface. The receiver of the first copper interface is connected to the transmitter of the second copper interface.

In still other features, the transmitters of the first and second NIC interfaces transmit a first configuration ordered set. The receiver of the second NIC interface receives a second configuration ordered set from the transmitter of the first NIC interface. The NIC module stores in memory first configuration data of the first device that is contained in the second configuration ordered set. The transmitter of the first copper interface transmits a first FLP burst. The first FLP burst contains at least one configuration parameter provided by the first configuration data.

In still other features, the first copper interface and the second copper interface complete autonegotiation by exchanging additional data and establishing a link. The transmitter of the second copper interface transmits second configuration data that is stored in the memory of the NIC module. The transmitter of the second NIC interface generates a second configuration ordered set that contains at least one configuration parameter provided by the second configuration data. The first and second NIC interfaces establish a link.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 5A and 5B are datagrams illustrating the exchange of autonegotiation information between a 1000BASE-X interface and a 1000BASE-T interface in accordance with the present invention.

DETAILED DESCRIPTION OF THE PREFERRED EMBODIMENTS

The following description of the preferred embodiment(s) is merely exemplary in nature and is in no way intended to limit the invention, its application, or uses.

Autonegotiation in both 1000BASE-T media and 1000BASE-X media includes 16 bits of autonegotiation data. In 1000Base-T media, however, the underlying mechanism of transmitting the bits is more complex. The 16 bits of data are embedded in a fast link pulse (FLP) burst. Generally, it takes more time to complete the 1000BASE-T autonegotiation than it does to complete the 1000BASE-X autonegotiation. In addition, there are many more bits defined for 1000BASE-T autonegotiation. In the GBIC application, only 1000BASE-T full duplex, 1000BASE-T half duplex, pause, and asymmetric pause functions are relevant. Other autonegotiation information that is required to establish a 1000BASE-T link (for example, master/slave information) has no relevance to 1000BASE-X. To restart autonegotiation on the 1000BASE-T side, the device wishing to restart breaks the communication link for over 1 second. During autonegotiation, the device does not transmit anything including fast link pulse bursts for over 1 second.

Figure 1:
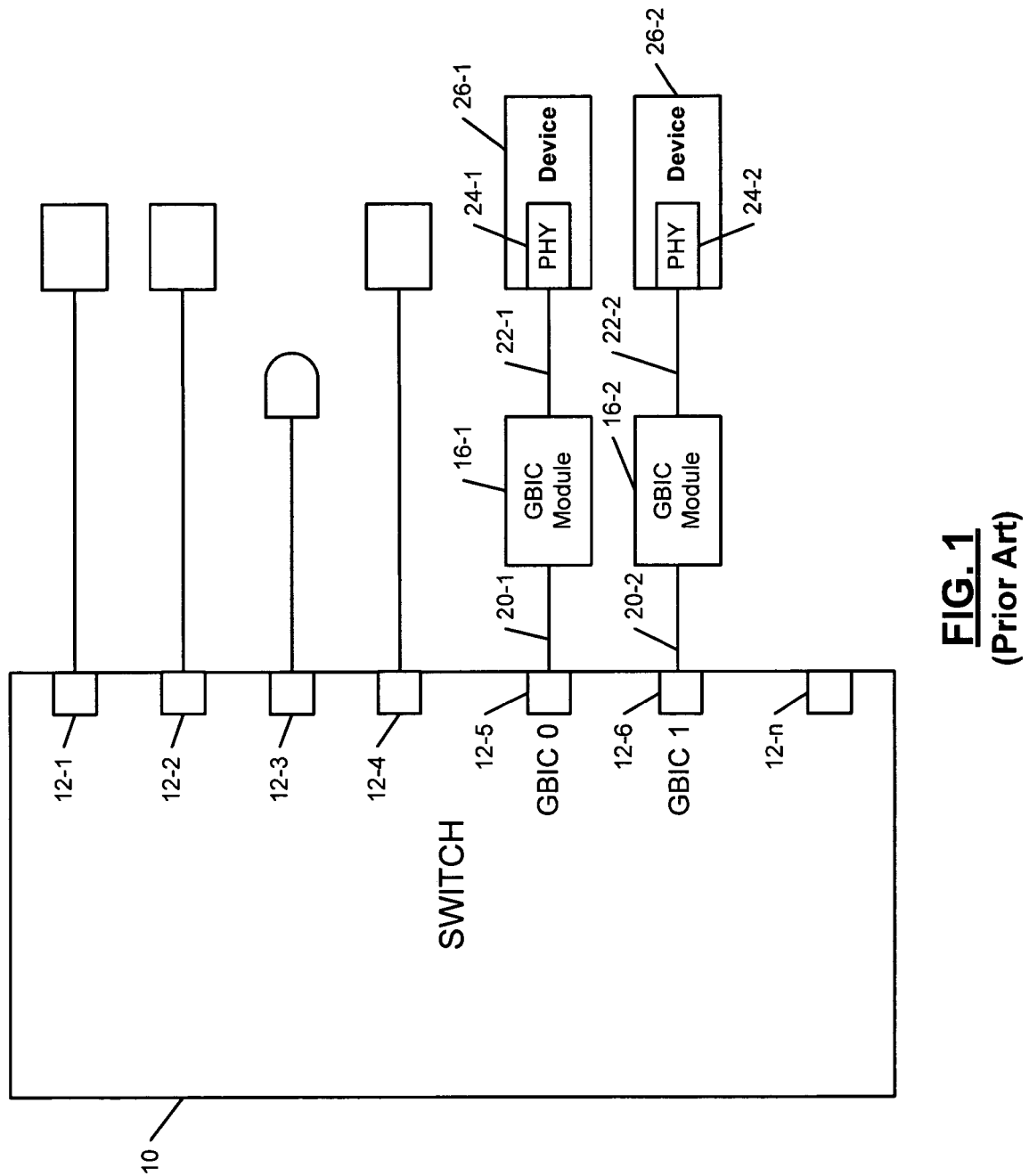
FIG. 1 illustrates the interface between an Ethernet switch having a GBIC module and a device according to the prior art.
Figure 2:
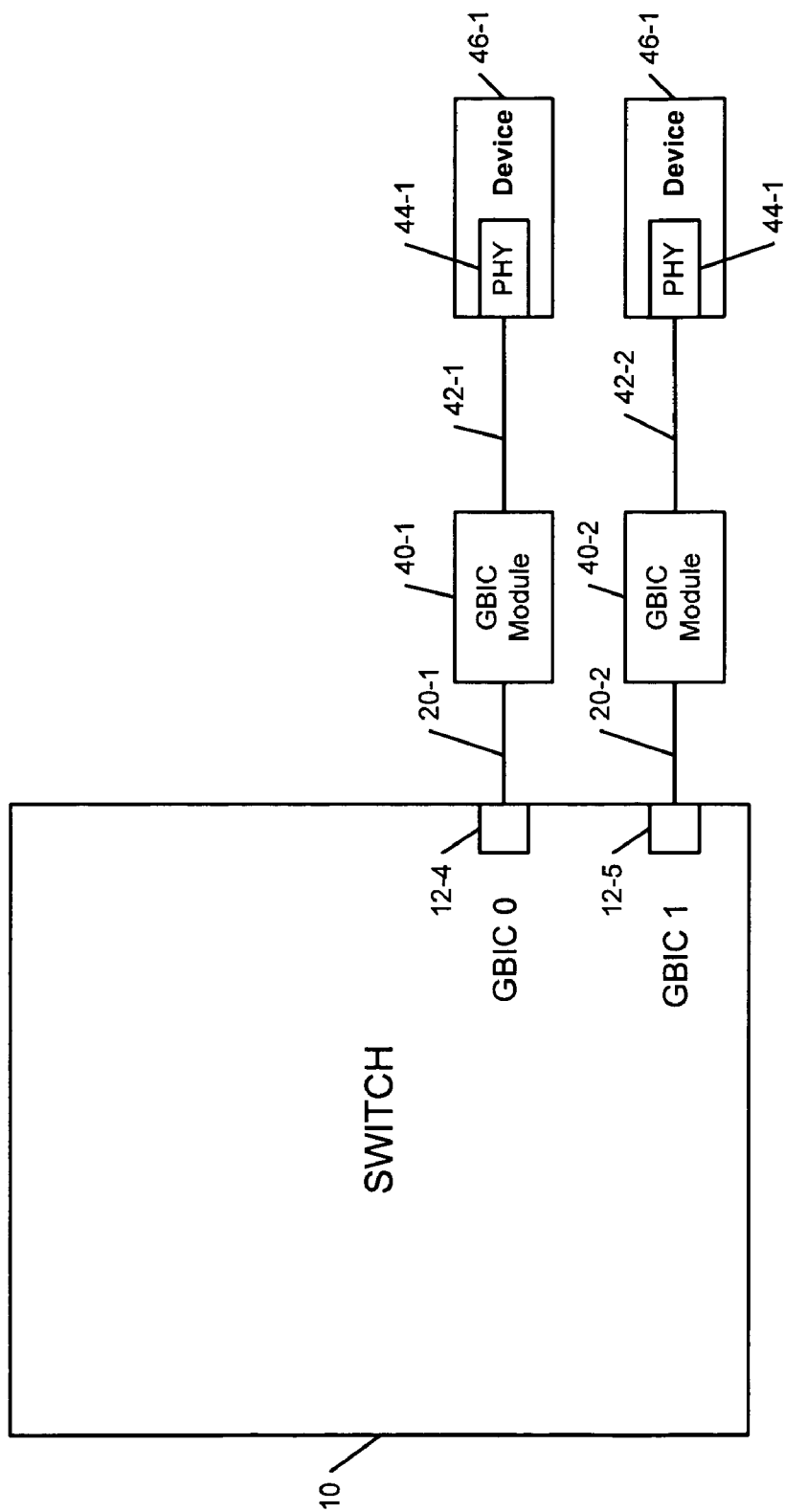
FIG. 2 illustrates the interface between an Ethernet switch having a GBIC module with flexible media capability and a device according to the prior art.
Figure 3:
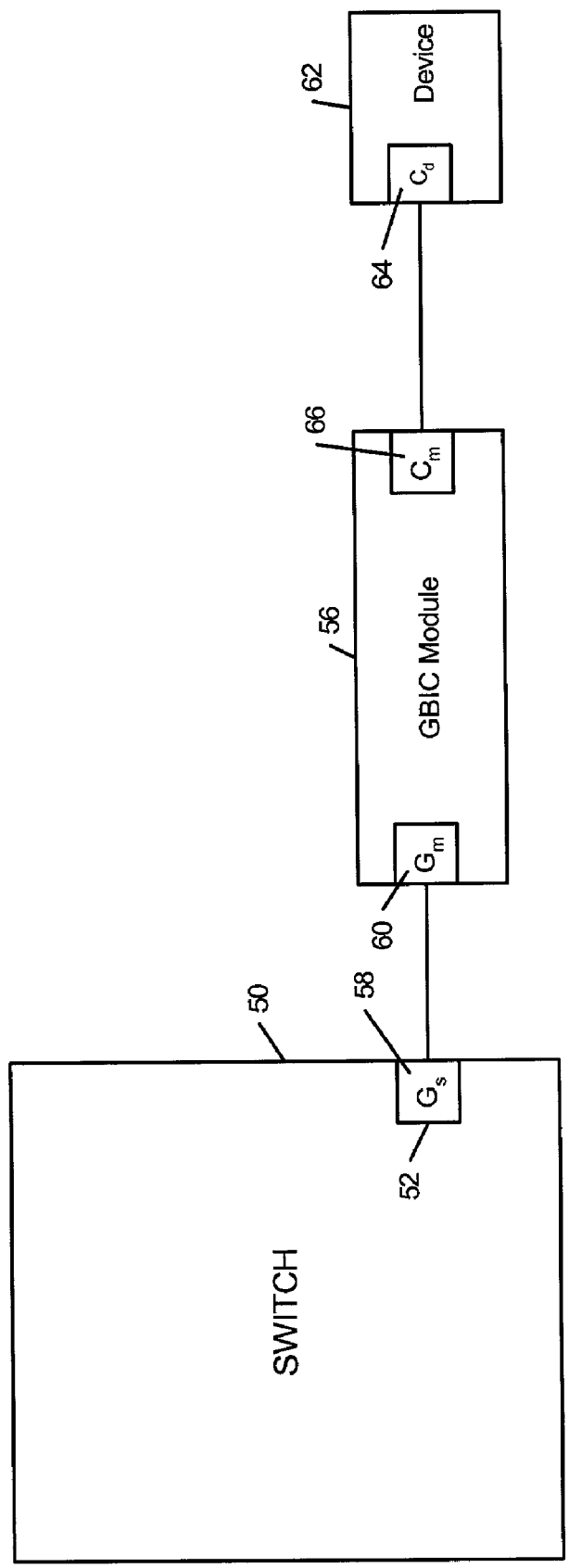
FIG. 3 illustrates the interface between an Ethernet switch having a GBIC module with flexible media capability and a device according to the present invention.

Referring now to FIG. 3, a switch 50 has a GBIC slot 52. A GBIC module 56 plugs into the GBIC slot 52. The switch 50 and the GBIC module 56 communicate via the 1000BASE-X protocol through an interface $G_s$ 58 (where G refers to GBIC and s refers to the switch 50), and an interface $G_m$ 80 (where G refers to GBIC and m refers to the GBIC module 56). A device 62 is connected to the switch 50. The device 62 has a 1000BASE-T interface $C_d$ 64 (where C refers to copper and d refers to the device 62). The GBIC module 56 also has a 1000BASE-T interface $C_m$ 66 (where C refers to copper and m refers to the GBIC module 56). An example of the GBIC module 56 is the PCM-8519-3 that is available from Finisar and that has the 1000BASE-X interface $G_m$ and the 1000BASE-T interface $C_m$. Currently, it is not possible for the switch 50 and the device 62 to exchange information about full duplex, half duplex or pause functions. The present invention solves this and other problems as will be described below.

Figure 4:
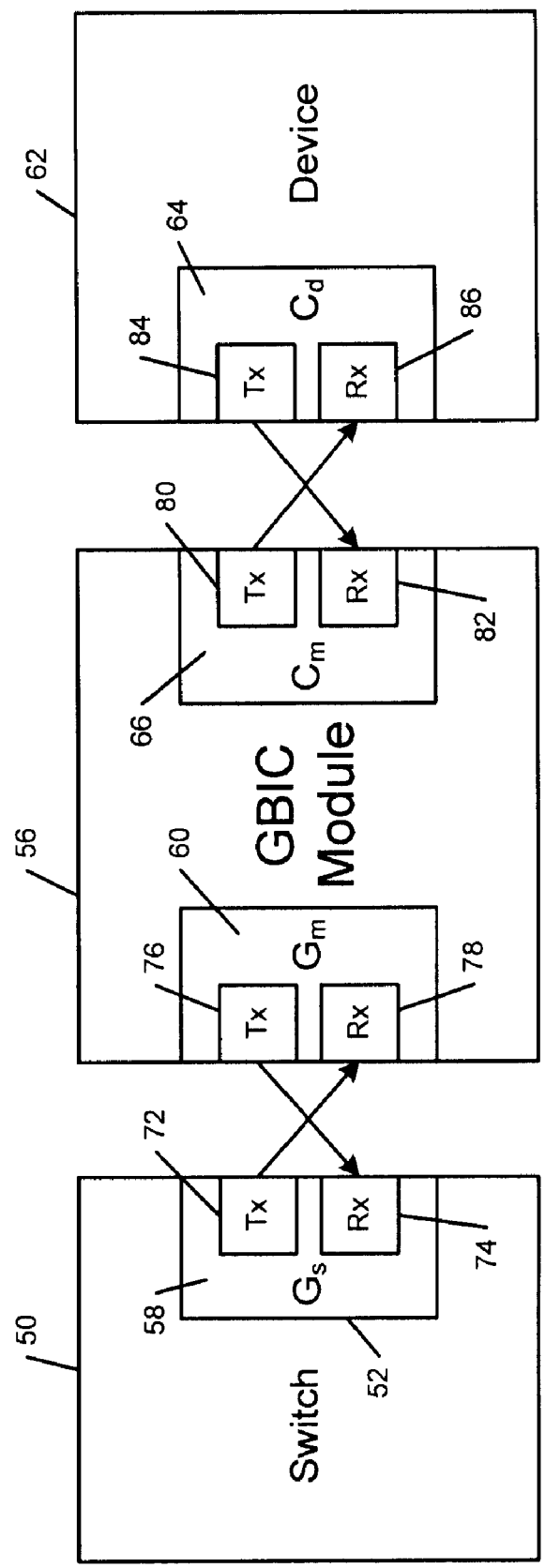
FIG. 4 illustrates the interface between an Ethernet switch having a GBIC module with mixed media capability and a device according to the present invention.

Referring now to FIG. 4, the interfaces $G_s$ 58 and $G_m$ 60 between the switch 50 and the GBIC module 56 and the interfaces $C_m$ 66 and $C_d$ 64 between the GBIC module 56 and the device 62 are shown. Each interface includes a transmitter (e.g. transmitters 72, 76, 80, and 84) and a receiver (e.g. receivers 74, 78, 82, and 86). The GBIC module 56 is preferably powered by the switch 50. Autonegotiation on the 1000BASE-X interface ($G_s$, $G_m$) is faster than the 1000BASE-T interface ($C_m$, $C_d$). Therefore, the GBIC module 56 will receive autonegotiation information faster from the switch 50 as compared to device 62.

Referring now to FIGS. 5A and 5B, information is passed between the 1000BASE-X interface and 1000BASE-T interface to allow autonegotiation. For ease of reference, section 1, section 2, . . . , section n are labeled as they are referenced. In section 1, after power up both the interfaces $G_s$ 58 and $G_m$ 60 transmit first configuration ordered sets with all 0 data to restart the 1000BASE-X autonegotiation process. The interface $C_d$ 64 sends fast link pulse (FLP) bursts to exchange 1000BASE-T autonegotiation information. However, unlike normal 1000BASE-T autonegotiation, the interface $C_m$ 66 is disabled or in a wait mode until the interface $G_s$ 58 transmits the first configuration ordered set with all zero data. Note that it may be possible that the interface $C_d$ 64 is not sending anything at this time.

In section 2, the interface $G_s$ 58 starts to transmit the second configuration ordered set with information on duplex and pause capabilities (in other words, not all bits are zero). However, the interface $G_m$ 60 is still forced to transmit all zeros which forces the interface $G_s$ 58 to wait. Note that it may be possible that the interface $C_d$ 64 is not sending anything at this time.

In section 3, after the interface $G_s$ 58 completes transmitting three consecutive second configuration ordered sets with identical data bits, the duplex and pause ability (and other functions that will be enabled in the future) of the switch 50 is stored by the GBIC module 56 in memory and these capabilities are advertised by the interface $C_m$ 66. The interface $C_m$ 66 starts transmitting (FLP) bursts with data advertising the capabilities of switch 50. Note that it may be possible that the interface $C_d$ 64 is not sending anything at this time.

In section 4, the interfaces $C_m$ 66 and $C_d$ 64 complete the 1000BASE-T autonegotiation. There must be additional information exchanged beyond advertising the capabilities of the switch 50 to bring the 1000BASE-T link up. This additional information exchange is transparent to the switch 50. The device 62 sees the advertised capabilities of the switch 50.

In section 5, the GBIC module 56 stores the capabilities advertised by the interface $C_d$ 64. The interface $G_m$ 60 subsequently starts transmitting configuration ordered sets that advertise the capabilities of the device 62. The switch 50 receives the advertised capabilities of device 62. In section 6, the 1000BASE-X autonegotiation completes and the 1000BASE-X link is up. The link between the switch 50 and the device 62 is established and normal packet data can be transmitted and received.

If for any reason the GBIC module 56 detects that the 1000BASE-X link is down (for example, the switch 50 transmits the first configuration ordered set with all zeros), the GBIC module 56 stops transmitting on the interface $C_m$ 66 for over a second. This causes the 1000BASE-T autonegotiation to restart. The steps outlined above are executed again. If the GBIC module 56 detects that the 1000BASE-T link is down (for example, the device 62 stops transmitting), the GBIC module 56 transmits the first configuration ordered set with all zeros. This restarts the 1000BASE-X autonegotiation. The steps outlined above are executed again.

Figure 6:
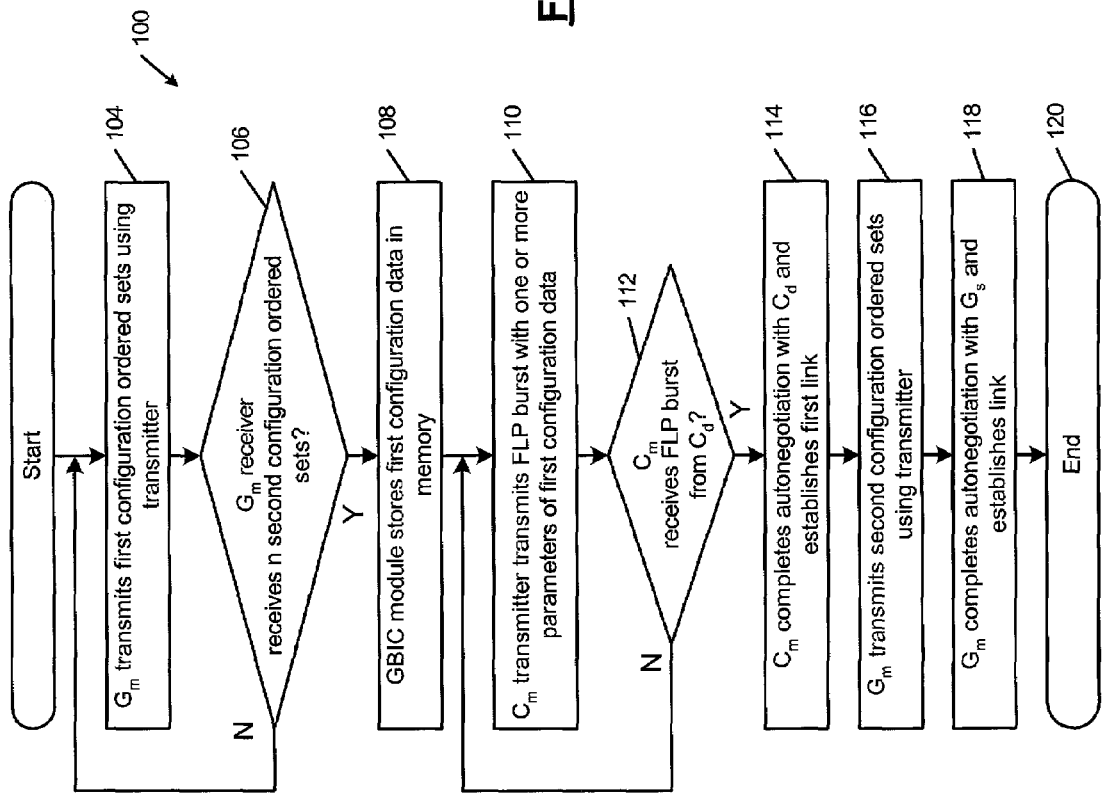
FIG. 6 is a flowchart illustrating steps performed by the GBIC module during autonegotiation.

Referring now to FIG. 6, steps performed by the GBIC module 56 are shown generally at 100. Control begins with step 102. In step 104, the interface $G_m$ 60 transmits the first configuration ordered sets using the transmitter 76. In step 106, when the receiver 78 of the interface $G_m$ receives the second configuration ordered set from the transmitter 72 of the interface $G_s$ 58, the GBIC module 56 stores first configuration data in memory. In step 110, the transmitter 80 of the interface $C_m$ 66 transmits FLP bursts with one or more parameters that are set based on the first configuration data. In step 112, if the receiver 82 of the interface $C_m$ 66 receives a FLP burst from the device 62, control continues with step 114. Otherwise control loops to step 110.

In step 114, the interface $C_m$ 66 completes autonegotiation with the interface $C_d$ 64 and establishes a first link (the 1000BASE-T link). The transmitter 84 sends second configuration data to the GBIC module 56, which stores the second configuration data in memory. In step 116, the transmitter 76 of the interface $G_m$ 60 transmits second configuration ordered sets that advertise the capabilities of the device 62. In step 118, the interface $G_m$ 60 completes a second link (the 1000BASE-X link). If the copper link goes down, autonegotiation is started on the fiber side. If the fiber link goes down, autonegotiation is started on the copper side.

Thus it will be appreciated from the foregoing that as a result of the present invention, an autonegotiation circuit and method for autonegotiation using first and second media is provided by which the principal objectives, among others, are completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. An autonegotiation circuit for Ethernet networks, comprising:
    a first device that communicates with a first media;
    a second device that communicates with a second media; and
    a Gigabit interface connector (GBIC) module that communicates with said first device over said first media and with said second device over said second media, wherein said GBIC provides autonegotiation between said first and second devices,
    wherein said first device includes a first GBIC interface including a transmitter and a receiver, said GBIC module includes a second GBIC interface with a transmitter and a receiver, said GBIC module includes a first copper interface with a transmitter and a receiver, and said second device includes a second copper interface with a transmitter and a receiver;
    wherein said transmitter of said first GBIC interface communicates with said receiver of said second GBIC interface and said receiver of said first GBIC interface communicates with said transmitter of said second GBIC interface, said transmitter of said first copper interface communicates with said receiver of said second copper interface and said receiver of said first copper interface communicates with said transmitter of said second copper interface, and said transmitters of said first and second GBIC interfaces transmit a first configuration ordered set; and
    wherein after said receiver of said second GBIC interface receives a second configuration ordered set from said transmitter of said first GBIC interface and said GBIC module stores in memory first configuration data of said first device that is contained in said second configuration ordered set, said transmitter of said first copper interface transmits a first fast link pulse (FLP) burst.

2. The autonegotiation circuit of claim 1 wherein said first media includes 1000BASE-LX media.

3. The autonegotiation circuit of claim 1 wherein said first media includes 1000BASE-SX media.

4. The autonegotiation circuit of claim 1 wherein said first media includes 1000BASE-X media.

5. The autonegotiation circuit of claim 1 wherein said second media includes 1000BASE-T media.

6. The autonegotiation circuit of claim 1 wherein said first FLP burst contains at least one configuration parameter provided by said first configuration data.

7. The autonegotiation circuit of claim 6 wherein said first copper interface and said second copper interface complete autonegotiation by exchanging additional data and establishing a link.

8. The autonegotiation circuit of claim 7 wherein said transmitter of said second copper interface transmits second configuration data that is stored in said memory of said GBIC module.

9. The autonegotiation circuit of claim 8 wherein said transmitter of said second GBIC interface generates a second configuration ordered set that contains at least one configuration parameter provided by said second configuration data.

10. The autonegotiation circuit of claim 9 wherein said first and second GBIC interfaces establish a link.

11. The autonegotiation circuit of claim 10 wherein when said link between said first and second GBIC interfaces is lost, autonegotiation is initiated between said first and second GBIC interfaces, and wherein when said link between said first and second copper interfaces is lost, autonegotiation is initiated between said first and second copper interfaces.

12. An autonegotiation circuit for Ethernet networks, comprising:
a switch that communicates with a first media;
a device that communicates with a second media that is a different type of media than said first media; and
a Gigabit interface connector (GBIC) module that communicates with said switch over said first media and with said device over said second media, wherein said GBIC module allows autonegotiation between said switch and said device,
wherein said switch includes a first GBIC interface with a transmitter and a receiver, said GBIC module includes a second GBIC interface with a transmitter and a receiver and a first copper interface with a transmitter and a receiver, and said device includes a second copper interface with a transmitter and a receiver,
wherein said transmitter of said first GBIC interface communicates with said receiver of said second GBIC interface and said receiver of said first GBIC interface communicates with said transmitter of said second GBIC interface,
wherein said transmitter of said first copper interface communicates with said receiver of said second copper interface and said receiver of said first copper interface communicates with said transmitter of said second copper interface,
wherein said transmitters of said first and second GBIC interfaces transmit a first configuration ordered set, and
wherein said transmitter of said first copper interface does not transmit a fast link pulse (FLP) burst until said transmitter of said first GBIC interface transmits said first configuration ordered set.

13. The autonegotiation circuit of claim 12 wherein said first media includes 1000BASE-LX media.

14. The autonegotiation circuit of claim 12 wherein said first media includes 1000BASE-SX media.

15. The autonegotiation circuit of claim 12 wherein said first media includes 1000BASE-X media.

16. The autonegotiation circuit of claim 12 wherein after said receiver of said second GBIC interface receives a second configuration ordered set from said transmitter of said first GBIC interface and said GBIC module stores in memory first configuration data of said switch that is contained in said second configuration ordered set, said transmitter of said first copper interface transmits a first fast link pulse (FLP) burst.

17. The autonegotiation circuit of claim 16 wherein said first fast link pulse (FLP) burst generated by said first copper interface contains at least one configuration parameter provided by said first configuration data.

18. The autonegotiation circuit of claim 17 wherein said first copper interface and said second copper interface complete 1000BASE-T autonegotiation by exchanging additional data and establishing a 1000BASE-T link.

19. The autonegotiation circuit of claim 18 wherein said memory of said GBIC module stores second configuration data of said device.

20. The autonegotiation circuit of claim 19 wherein said transmitter of said second GBIC interface generates a second configuration ordered set that contains at least one configuration parameter provided by said second configuration data.

21. The autonegotiation circuit of claim 20 wherein said first GBIC interface and said second GBIC interface complete 1000BASE-X autonegotiation and establish a 1000BASE-X link.

22. An autonegotiation circuit for Ethernet networks, comprising:
first means for communicating with a first media;
second means for communicating with a second media; and
network interfacing means for communicating with said first means over said first media and with said second means over said second media and for providing autonegotiation between said first and second means,
wherein said network interfacing means includes a Gigabit interface connector (GBIC) module,
wherein said first means includes a first network interfacing means including a transmitter and a receiver,
wherein said network interfacing means includes:
a second network interface with a transmitter and a receiver; and
a first copper interface with a transmitter and a receiver,
wherein said second means includes a second copper interface with a transmitter and a receiver,
wherein said transmitter of said first network interface communicates with said receiver of said second network interface and said receiver of said first network interface communicates with said transmitter of said second network interface,
wherein said transmitter of said first copper interface communicates with said receiver of said second copper interface and said receiver of said first copper interface communicates with said transmitter of said second copper interface,
wherein said transmitters of said first and second network interfaces transmit a first configuration ordered set, and
wherein after said receiver of said second network interface receives a second configuration ordered set from said transmitter of said first network interface and said network interfacing means stores in memory first configuration data of said first means that is contained in said second configuration ordered set, said transmitter of said first copper interface transmits a first fast link pulse (FLP) burst.

23. The autonegotiation circuit of claim 22 wherein said first media includes 1000BASE-LX media.

24. The autonegotiation circuit of claim 22 wherein said first media includes 1000BASE-SX media.

25. The autonegotiation circuit of claim 22 wherein said first media includes 1000BASE-X media.

26. The autonegotiation circuit of claim 22 wherein said second media includes 1000BASE-T media.

27. The autonegotiation circuit of claim 22 wherein said first FLP burst contains at least one configuration parameter provided by said first configuration data.

28. The autonegotiation circuit of claim 27 wherein said first copper interface and said second copper interface complete autonegotiation by exchanging additional data and establishing a link.

29. The autonegotiation circuit of claim 28 wherein said transmitter of said second copper interface transmits second configuration data that is stored in said memory of said network interfacing means.

30. The autonegotiation circuit of claim 29 wherein said transmitter of said second network interface generates a second configuration ordered set that contains at least one configuration parameter provided by said second configuration data.

31. The autonegotiation circuit of claim 30 wherein said first and second network interfaces establish a link.

32. The autonegotiation circuit of claim 31 wherein when said link between said first and second network interfaces is lost, autonegotiation is initiated between said first and second network interfaces, and wherein when said link between said first and second copper interfaces is lost, autonegotiation is initiated between said first and second copper interfaces.

33. A method for establishing a link on an Ethernet network, comprising:
coupling a first media to a first device;
coupling a second media to a second device, wherein said second media is a different type of media than said first media;
using a Gigabit interface connector (GBIC) module to communicate with said first device over said first media and with said second device over said second media, wherein said GBIC module allows autonegotiation between said first and second devices;
providing a first GBIC interface including a transmitter and a receiver in said first device;
providing a second GBIC interface with a transmitter and a receiver in said GBIC;
providing a first copper interface with a transmitter and a receiver in said GBIC;
providing a second copper interface with a transmitter and a receiver in said second device;
establishing communications between said transmitter of said first GBIC interface and said receiver of said second NIC interface and between said receiver of said first GBIC interface and said transmitter of said second GBIC interface;
establishing communications between said transmitter of said first copper interface and said receiver of said second copper interface and between said receiver of said first copper interface and said transmitter of said second copper interface;
transmitting a first configuration ordered set using said transmitters of said first and second GBIC interfaces; and
transmitting a first fast link pulse (FLP) burst using said transmitter of said first copper interface after said receiver of said second GBIC interface receives a second configuration ordered set from said transmitter of said first GBIC interface and said GBIC module stores in memory first configuration data of said first device that is contained in said second configuration ordered set.

34. The method of claim 33 wherein said first media includes 1000BASE-LX media.

35. The method of claim 33 wherein said first media includes 1000BASE-SX media.

36. The method of claim 33 wherein said first media includes 1000BASE-X media.

37. The method of claim 33 wherein said second media includes 1000BASE-T media.

38. The method of claim 33 further comprising inserting at least one configuration parameter provided by said first configuration data in said first FLP burst.

39. The method of claim 38 further comprising completing autonegotiation by exchanging additional data and establishing a link between said first copper interface and said second copper interface.

40. The method of claim 39 further comprising transmitting second configuration data that is stored in said memory of said GBIC using said transmitter of said second copper interface.

41. The method of claim 40 further comprising generating a second configuration ordered set that contains at least one configuration parameter provided by said second configuration data using said transmitter of said second GBIC interface.

42. The method of claim 41 further comprising establishing a link between said first and second GBIC interfaces.

43. The method of claim 42 further comprising initiating autonegotiation between said first and second GBIC interfaces when said link between said first and second GBIC interfaces is lost.

44. The method of claim 43 further comprising initiating autonegotiation between said first and second copper interfaces when said link between said first and second copper interfaces is lost.

45. An Ethernet network, comprising:
a first device that communicates with a first media;
a second device that communicates with a second media, wherein said first media is a different media than said second media; and
Gigabit interface connector (GBIC) module that communicates with said first device over said first media and with said second device over said second media, wherein said GBIC module provides autonegotiation between said first and second devices,
wherein said first device includes a first GBIC interface including a transmitter and a receiver, said GBIC module includes a second GBIC interface with a transmitter and a receiver, said GBIC module includes a first copper interface with a transmitter and a receiver, and said second device includes a second copper interface with a transmitter and a receiver,
wherein said transmitter of said first GBIC interface communicates with said receiver of said second GBIC interface and said receiver of said first GBIC interface communicates with said transmitter of said second GBIC interface,
wherein said transmitter of said first copper interface communicates with said receiver of said second copper interface and said receiver of said first copper interface communicates with said transmitter of said second copper interface,
wherein said transmitters of said first and second GBIC interfaces transmit a first configuration ordered set, and
wherein after said receiver of said second GBIC interface receives a second configuration ordered set from said transmitter of said first GBIC interface and said GBIC module stores in memory first configuration data of said first device that is contained in said second configuration ordered set, said transmitter of said first copper interface transmits a first fast link pulse (FLP) burst.

46. The Ethernet network of claim 45 wherein said first media includes 1000BASE-LX media.

47. The Ethernet network of claim 45 wherein said first media includes 1000BASE-SX media.

48. The Ethernet network of claim 45 wherein said first media includes 1000BASE-X media.

49. The Ethernet network of claim 45 wherein said second media includes 1000BASE-T media.

50. The Ethernet network of claim 45 wherein said first FLP burst contains at least one configuration parameter provided by said first configuration data.

51. The Ethernet network of claim 50 wherein said first copper interface and said second copper interface complete autonegotiation by exchanging additional data and establishing a link.

52. The Ethernet network of claim 51 wherein said transmitter of said second copper interface transmits second configuration data that is stored in said memory of said GBIC module.

53. The Ethernet network of claim 52 wherein said transmitter of said second GBIC interface generates a second configuration ordered set that contains at least one configuration parameter provided by said second configuration data.

54. The Ethernet network of claim 53 wherein said first and second GBIC interfaces establish a link.

55. The Ethernet network of claim 54 wherein when said link between said first and second GBIC interfaces is lost, autonegotiation is initiated between said first and second GBIC interfaces, and wherein when said link between said first and second copper interfaces is lost, autonegotiation is initiated between said first and second copper interfaces.

56. An Ethernet network, comprising:
first means for communicating with a first media;
second means for communicating with a second media, wherein said first media is a different media than said second media; and
network interface means for communicating with said first means over said first media and with said second means over said second media and for providing autonegotiation between said first and second means,
wherein said network interface means includes a Gigabit interface connector (GBIC) module, said first means includes a first interface including a transmitter and a receiver, said network interface means includes a second interface with a transmitter and a receiver, said network interface means includes a first copper interface with a transmitter and a receiver, and said second means includes a second copper interface with a transmitter and a receiver,
wherein said transmitter of said first interface communicates with said receiver of said second interface and said receiver of said first interface communicates with said transmitter of said second interface,
wherein said transmitter of said first copper interface communicates with said receiver of said second copper interface and said receiver of said first copper interface communicates with said transmitter of said second copper interface,
wherein said transmitters of said first and second interfaces transmit a first configuration ordered set, and
wherein after said receiver of said second interface receives a second configuration ordered set from said transmitter of said first interface and said network interface means stores in memory first configuration data of said first means that is contained in said second configuration ordered set, said transmitter of said first copper interface transmits a first fast link pulse (FLP) burst.

57. The Ethernet network of claim 56 wherein said first media includes 1000BASE-LX media.

58. The Ethernet network of claim 56 wherein said first media includes 1000BASE-SX media.

59. The Ethernet network of claim 56 wherein said first media includes 1000BASE-X media.

60. The Ethernet network of claim 56 wherein said second media includes 1000BASE-T media.

61. The Ethernet network of claim 56 wherein said first FLP burst contains at least one configuration parameter provided by said first configuration data.

62. The Ethernet network of claim 61 wherein said first copper interface and said second copper interface complete autonegotiation by exchanging additional data and establishing a link.

63. The Ethernet network of claim 62 wherein said transmitter of said second copper interface transmits second configuration data that is stored in said memory of said network interface means.

64. The Ethernet network of claim 63 wherein said transmitter of said second interface generates a second configuration ordered set that contains at least one configuration parameter provided by said second configuration data.

65. The Ethernet network of claim 64 wherein said first and second interfaces establish a link.

66. The Ethernet network of claim 65 wherein when said link between said first and second interfaces is lost, autonegotiation is initiated between said first and second interfaces, and wherein when said link between said first and second copper interfaces is lost, autonegotiation is initiated between said first and second copper interfaces.

67. A method for establishing a link on an Ethernet network, comprising:
coupling a first media to a switch;
coupling a second media to a device, wherein said second media is a different type of media than said first media;
using a Gigabit interface connector (GBIC) module to communicate with said switch over said first media and with said device over said second media, wherein said GBIC module allows autonegotiation between said switch and said device;
providing a first GBIC interface including a transmitter and a receiver in said switch;
providing a second GBIC interface with a transmitter and a receiver in said GBIC module;
providing a first copper interface with a transmitter and a receiver in said GBIC module;
providing a second copper interface with a transmitter and a receiver in said device;
establishing communications between said transmitter of said first GBIC interface and said receiver of said second GBIC interface and between said receiver of said first GBIC interface and said transmitter of said second GBIC interface;
establishing communications between said transmitter of said first copper interface and said receiver of said second copper interface and between said receiver of said first copper interface and said transmitter of said second copper interface;
transmitting a first configuration ordered set using said transmitters of said first and second GBIC interfaces; and
transmitting a first fast link pulse (FLP) burst using said transmitter of said first copper interface after said receiver of said second GBIC interface receives a second configuration ordered set from said transmitter of said first GBIC interface and said GBIC module stores in memory first configuration data of said switch that is contained in said second configuration ordered set.

68. The method of claim 67 wherein said first media includes 1000BASE-LX media.

69. The method of claim 67 wherein said first media includes 1000BASE-SX media.

70. The method of claim 67 wherein said first media includes 1000BASE-X media.

71. The method of claim 67 wherein said second media includes 1000BASE-T media.

72. The method of claim 67 further comprising inserting at least one configuration parameter provided by said first configuration data in said first FLP burst.

73. The method of claim 72 further comprising completing autonegotiation by exchanging additional data and establishing a link between said first copper interface and said second copper interface.

74. The method of claim 73 further comprising transmitting second configuration data that is stored in said memory of said GBIC module using said transmitter of said second copper interface.

75. The method of claim 74 further comprising generating a second configuration ordered set that contains at least one configuration parameter provided by said second configuration data using said transmitter of said second GBIC interface.

76. The method of claim 75 further comprising establishing a link between said first and second GBIC interfaces.

77. The method of claim 76 further comprising initiating autonegotiation between said first and second GBIC interfaces when said link between said first and second GBIC interfaces is lost.

78. The method of claim 77 further comprising initiating autonegotiation between said first and second copper interfaces when said link between said first and second copper interfaces is lost.

* * * * *

UNITED STATES PATENT AND TRADEMARK OFFICE
CERTIFICATE OF CORRECTION

PATENT NO.         : 7,570,657 B1                                Page 1 of 1
APPLICATION NO. : 09/991284
DATED              : August 4, 2009
INVENTOR(S)        : William Lo It is certified that error appears in the above-identified patent and that said Letters Patent is hereby corrected as shown below:

Column 9, Line 26    Delete "NIC" and insert -- GBIC --

Signed and Sealed this

Sixth Day of October, 2009

David J. Kappos
*Director of the United States Patent and Trademark Office*